United States Patent
Reay et al.

[11] Patent Number: 5,497,663
[45] Date of Patent: Mar. 12, 1996

[54] FLOW RATE LOGGING SEEPAGE METER

[75] Inventors: William G. Reay, Bellspring; Harry G. Walthall, Gloucester Point, both of Va.

[73] Assignee: The United States of America as represented by the Administrator of National Aeronautics and Space Administration, Washington, D.C.

[21] Appl. No.: 243,601

[22] Filed: May 4, 1994

Related U.S. Application Data

[63] Continuation of Ser. No. 988,077, Dec. 7, 1992, abandoned.

[51] Int. Cl.[6] ........................................... G01F 3/38
[52] U.S. Cl. ................... 73/861; 73/232; 73/269
[58] Field of Search ........................ 73/38, 223, 224, 73/232, 269, 73, 861

[56] References Cited

U.S. PATENT DOCUMENTS

| | | | |
|---|---|---|---|
| 3,359,787 | 12/1967 | Zemanek, Jr. | 73/224 X |
| 3,463,004 | 8/1969 | Withnell | 73/232 |
| 4,072,044 | 2/1978 | Farwell et al. | 73/38 |
| 4,099,406 | 7/1978 | Fulkerson | 73/73 |
| 4,431,425 | 2/1984 | Thompson et al. | 73/269 X |
| 4,669,308 | 6/1987 | Jorritsma | 73/861 X |

*Primary Examiner*—Richard Chilcot
*Assistant Examiner*—George M. Dombroske
*Attorney, Agent, or Firm*—Kimberly A. Chasteen

[57] ABSTRACT

An apparatus for remotely measuring and logging the flow rate of groundwater seepage into surface water bodies. As groundwater seeps into a cavity created by a bottomless housing, it displaces water through an inlet and into a waterproof sealed upper compartment, at which point, the water is collected by a collection bag, which is contained in a bag chamber. A magnet on the collection bag approaches a proximity switch as the collection bag fills, and eventually enables the proximity switch to activate a control circuit. The control circuit then rotates a three-way valve from the collection path to a discharge path, enables a data logger to record the time, and enables a pump, which discharges the water from the collection bag, through the three-way valve and pump, and into the sea. As the collection bag empties, the magnet leaves the proximity of the proximity switch, and the control circuit turns off the pump, resets the valve to provide a collection path, and restarts the collection cycle.

2 Claims, 3 Drawing Sheets

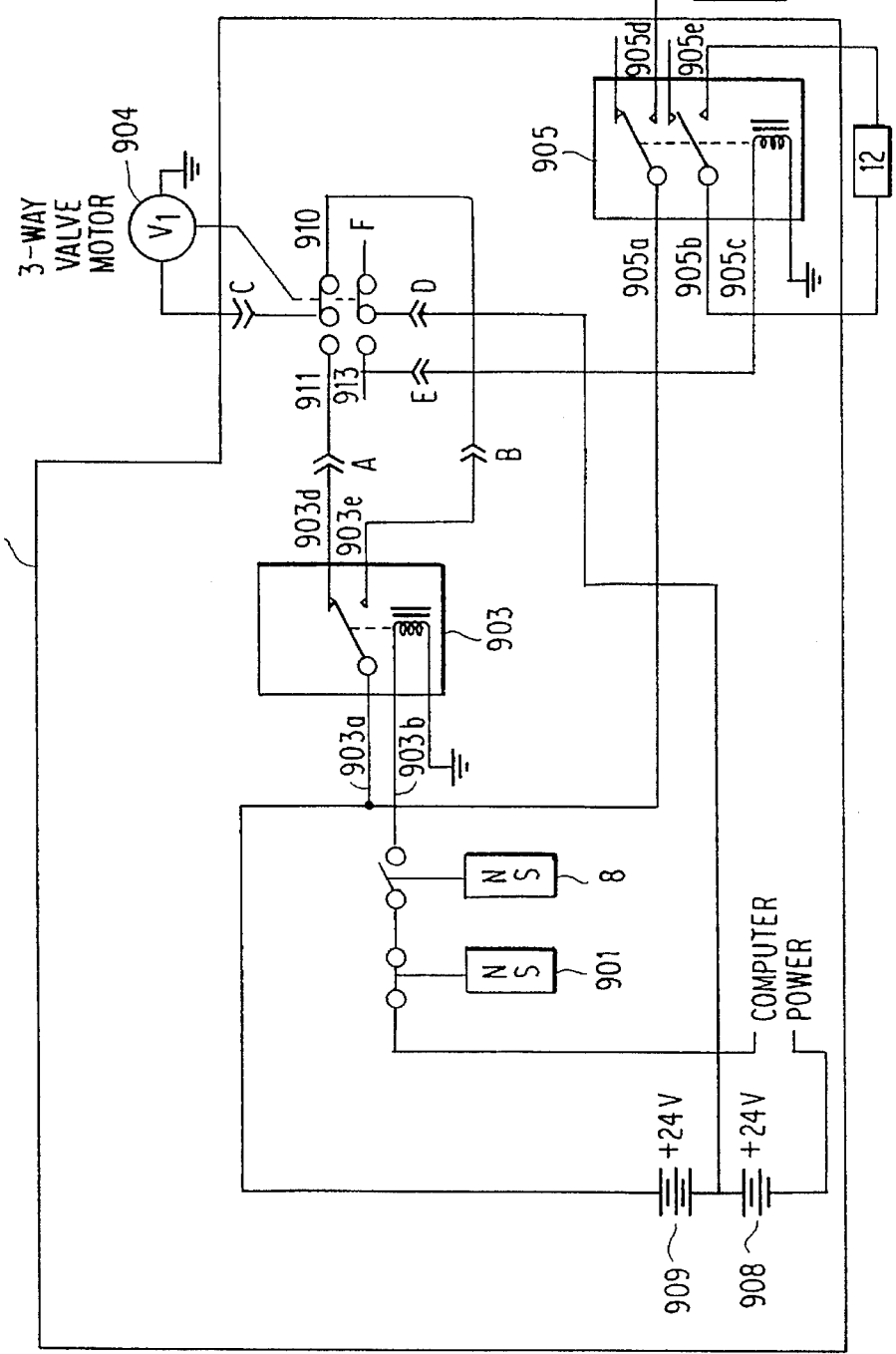
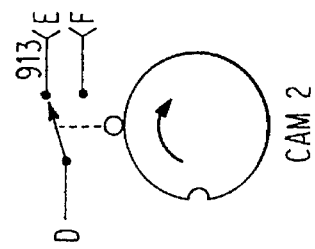
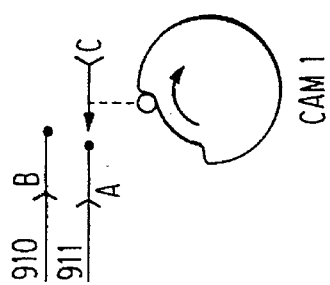
FIG. 2(a)
FIG. 2(b)
FIG. 2(c)

FLOW RATE LOGGING SEEPAGE METER

ORIGIN OF THE INVENTION

The invention described herein was made by a Government employee and a graduate student, and may be manufactured and used by or for the Government for governmental purposes without the payment of any royalties thereon or therefor.

This is a continuation of application Ser. No. 07/988,077 filed on Dec. 7, 1992, now abandoned.

BACKGROUND OF THE INVENTION

The present invention relates to an apparatus and method of measuring the movement of groundwater and, more particularly, to a remotely operating semi-continuous flow rate logging seepage meter for measuring the movement of groundwater seepage into surface water bodies on a semi-continuous basis and for logging the measured information.

The environmental concern for inland and coastal water bodies has led to a considerable amount of research for defining material input into these waters. Based on such research, the movement of groundwater and its associated solutes from upland regions has been linked to the degradation of receiving surface water bodies. Mechanisms responsible for advective transport of solutes within nearshore sediments include elevated upland hydraulic head (i.e., groundwater discharge), convective flows caused by thermal and salinity density differences, sedimentation, spatial variations in sea state (i.e., subtidal pumping), benthic boundary currents, and bioadvection. In addition to influencing water quality management efforts, such transport mechanisms are of biological and geological importance.

Macroscopic seepage rates of water across the sediment-water interface typically range from 0.0 to 5.0 $L \cdot M^{-2} \cdot hr^{-1}$. Hydraulic head differences between overlying surface waters and interstitial water is on the order of millimeters for most nearshore environments. Given such low and varied flow rates and hydraulic head differences, current flow meter technology is inadequate and the measurement of such phenomena remains a technical problem.

Current efforts to measure the direct influx of water have conventionally been through a manually operated seepage measuring devices, such as that disclosed by D. R. Lee, in "A Device for Measuring Seepage Flux in Lakes and Estuaries," *Limnology and Oceanography*, 22: 140–147, 1977. A typical seepage meter generally includes an open-bottom cylinder covered by a vented lid that allows a water collection bladder to be attached. The seepage meter is placed into the sediment, and water entering the meter is collected into the collection bladder. After a certain amount of time and if the collection bladder is full, the full collection bladder is retrieved and replaced with a new bladder. This is typically performed by a diver. The amount of groundwater discharge is determined by the volume of water displaced per cross-sectional area of seepage meter per unit time.

However, such manually operated seepage meters are disadvantageous in that they require extensive manual intervention and work effort.

In addition, conventional apparatus and methods require divers to monitor and replace collection bags, and record the number of discharges over a given time period. This leads to only being able to obtain a small number of data samples, which in turn renders incomplete and sometimes inaccurate results.

SUMMARY OF THE INVENTION

It is accordingly an object of the present invention to overcome the above disadvantages and problems of the prior art by providing a remotely operated semi-continuous flow rate logging seepage meter by automating the collecting-discharging-data logging cycle to allow remote collection and more sample data with less effort.

Another feature and advantage of the present invention is the ability to gather numerous data samples without manual interaction for time periods on the order of weeks.

Another feature and advantage of the present invention is the ability to attain data at increased depths. Divers are no longer needed to periodically retrieve and replace the collection bladders and log the data points, therefore the present invention can be deployed deeper than manual seepage meters.

Other features and advantages of the present invention include additional applications that address extremely low flow rates in conjunction with low pressures. When used along with proper hardware material, potential industrial uses of this flow meter concept may include flow rate measurements of caustic and corrosive fluids.

The above and other objects, advantages, and features of the present invention are accomplished by providing an apparatus for determining the flow rate of groundwater seepage including a collection inlet and a discharge outlet, a collection bag, coupled to the collection inlet and the discharge outlet, for collecting groundwater through the collection inlet during a collection cycle and discharging groundwater through the discharge outlet during a discharge cycle, a controller, responsive to first and second signals, for controlling the collection and discharge cycles, a switching circuit producing the first signal after a predetermined amount of groundwater is collected in the collection bag during the collection cycle and producing the second signal after a predetermined amount of groundwater is discharged during the discharge cycle, and a data logger, responsive to a first output of the controller, for measuring at least one of the amount of groundwater collected and discharged so as to determine the flow rate of groundwater seepage.

Further in accordance with the above objects, advantages, and features, the present invention provides an apparatus for determining the flow rate of groundwater seepage including inlet means, outlet means, collecting means, coupled to the inlet and outlet means, for collecting groundwater through the inlet means during a collection cycle and discharging groundwater through the outlet means during a discharge cycle, control means, responsive to first and second signals, for controlling the collection and discharge cycles, switch means for producing the first signal after a predetermined amount of groundwater is collected in the collecting means during the collection cycle and producing the second signal after a predetermined amount of groundwater is discharged during the discharge cycle, recording means, responsive to a first output of the controller, for measuring at least one of the amount of groundwater collected and discharged so as to determine the flow rate of groundwater seepage.

In further accordance with the above objects, advantages, and features, the present invention provides a method for determining the flow rate of groundwater seepage including the steps of a) collecting water into a collection bag, b) determining when a predetermined amount of water has been collected in the collection bag, c) discharging the water from the collection bag, d) recording the time of one of collecting and discharging steps, and e) repeating the steps a) through d). Brief Description of the Drawings FIGS. 1a and 1b respectively illustrate a top and side view of a seepage measuring apparatus in accordance with a preferred embodiment of the present invention.

FIGS. 2(a)–(c) are an electrical schematic of a control circuit of FIGS. 1.

DETAILED DESCRIPTION OF THE PREFERRED EMBODIMENTS

Figure 1A:
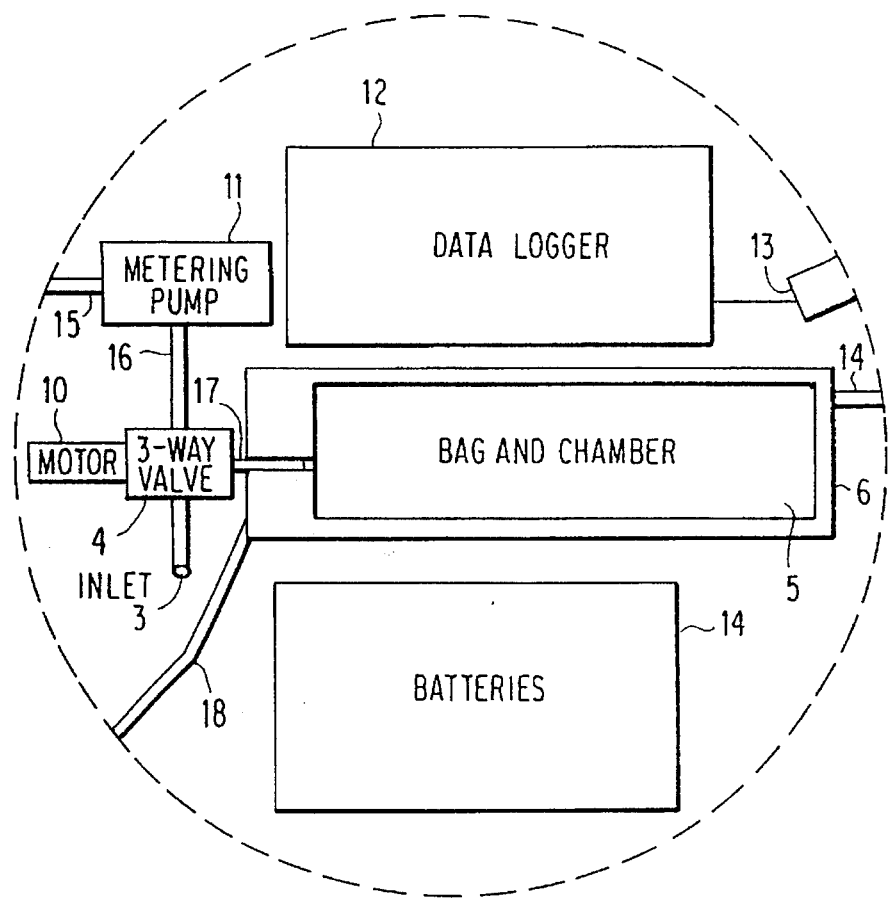
Figure 1B:
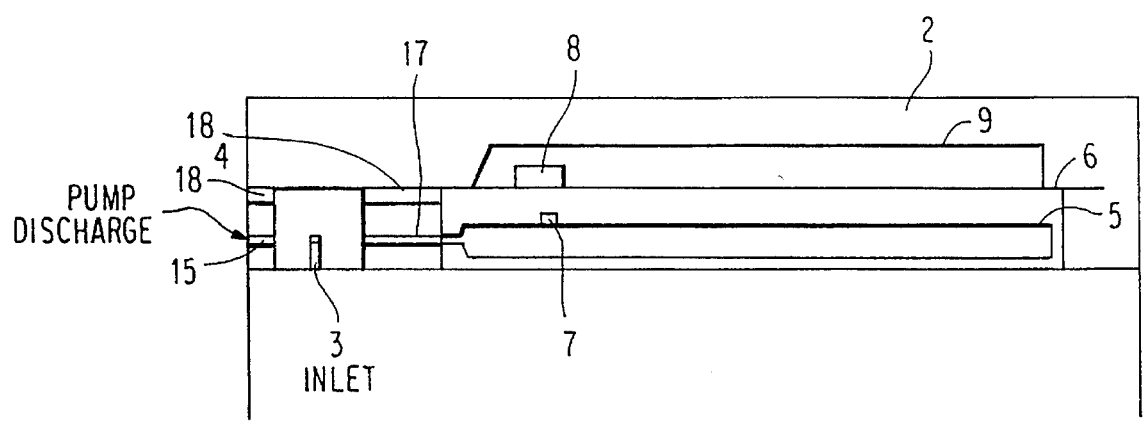

FIGS. 1(a) and 1(b) respectively illustrate a top and side view of a flow rate seepage measuring apparatus. The apparatus is housed in a waterproof upper compartment 2 of a bottomless cylinder 1, which is made of, for example, 16 gauge stainless steel and has a cross-sectional area of 0.25 $m^2$. The bottomless cylinder 1 is placed in the sediment at a predetermined water depth of up to approximately 40 meters. The total weight of the seepage meter and components is approximately 50 kilograms.

The apparatus includes a collection bag 5 contained within a chamber 6, which has openings through tubes 18, 19 to the surrounding atmosphere, which may be sea water, such that the chamber and the collection bag 5 are maintained at sea pressure. During water collection cycles, the collection bag 5 receives and collects ground water through a pipe 17, a three-way valve 4, which is controlled by a valve motor 10, and an inlet pipe 3, which communicates to the area below the waterproof upper compartment 2 within the bottomless cylinder 1. The collection bag 5 expands as water is collected therein. During water discharge cycles, water is discharged from the collection bag 5 through the pipe 17, three-way valve 4, a pipe 16, metering pump 11, and pipe 15 to the nearby body of water or open sea.

A magnet 7, which may be a ceramic magnet, is affixed to the collection bag 5 so that after the bag expands a predetermined amount during the water collection cycle, a magnetically responsive proximity switch 8 (e.g., a single pole, single throw magnetically triggered reed switch) is switched to trigger a control circuit 9 to begin a discharge cycle. The control circuit 9, which is shown in more detail in FIG. 2, controls the water collection and water discharge cycles as well as controlling a data logger 12. The data logger 12 records data, such as the time of day or the time between consecutive water collection or discharge cycles in order to measure the amount of groundwater seeping into the surface water bodies, and data corresponding to the tidal/sea conditions, which is detected by a pressure transducer 13 on a periodic basis.

The apparatus is powered by a power supply, for example, rechargeable batteries 14.

Referring to FIGS. 2(a), 2(b), and 2(c), there is shown a schematic diagram of the control circuit 9. The circuit 9 is powered by DC power, which is provided by two 12-volt rechargeable batteries 908, 909, connected in series to provide both 12 and 24-volt terminals. Alternatively, the DC power could be provided by, for example, four 6-volt rechargeable batteries connected in series. An input of a manually operable switch 901, such as a single-throw switch, is connected to the 12-volt terminal of the first battery 908, and an output of the switch 901 is connected to a first input of the proximity switch 8. An output of the proximity switch 8 is connected to a first input 903b of a relay 903, whose second input 903a is coupled to the 24-volt terminal. The relay 903 is illustrated by way of example as a singlepole, double-throw relay. Two outputs 903d, 903e of the relay 903 are respectively coupled to a discharge input 910 and collection input 911 of a cam-operated switch. The cams CS1 applies power to the valve motor 10 for a predetermined period of time, which is long enough to allow the valve 4 to rotate from the discharge port to the collection port or vice versa. The discharge terminal 910 of the motor 10 is also connected to a triggering input 905c of a relay 905, which is shown in FIG. 2 as a double-pole, double-throw relay 905, through a second cam CS2. The relay 905 has inputs 905a, 905b connected respectively to the 24-volt terminal and the data logger 12, and outputs 905d, 905e connected to an input of the pump 10, its solenoid timer 11a, and an output of the data logger 12, respectively. The closing of the poles 905(b), 905(e) enables the data logger to begin the recording process.

In a typical application, the circuit 9 is turned on and initiated by manually closing the switch 901. The apparatus is placed into the underwater, coastal sediment of a surface water body so that the sediment and water fills the bottomless cylinder 1. At this time, the apparatus is in the water collection cycle wherein groundwater, which seeps from the ground into the bottomless cylinder, is collected by the collection bag 5 through the inlet 3, three-way valve 4, and pipe 17. During the water collection cycle, the system is electrically shut down to conserve power. As the collection bag 5 fills with water and expands, the magnet 7 on the collection bag 5 approaches the magnetically responsive proximity switch 8. After the magnet 7 is within a predetermined distance from the proximity switch 8, the switch 8 closes so as to provide 12-volts to the relay 903. The single pole of the relay 903 is switched to make contact with the discharge cycle pole 903e so as to provide power to the valve motor 904 through the pole 910 for a period of time, which determined by the cam switch CS1. The cam switch CS1 applies power to the valve motor 904 long enough to rotate the valve 4 to the discharge port.

When the valve 4 reaches the discharge port position, the cam switch CS1 is opened to remove power from valve motor 904 and cam switch CS2 is switched to pole 913 thereby applying 12-volts to the relay 905. This applies 24-volts to the pump timer 11a and metering pump 11 through the inputs 905a and 905d and causes the input 905b to make contact with the pole 905e so as to signal the data logger 12 to being recording the date and time of the cycle. The data logger 12 records data, such as the time-of-day of the beginning of the discharge cycle or the time between consecutive discharge cycles, depending on data preference. At the same time, the metering pump 11 discharges the seepage water, which was collected in the collection bag 5, to the open sea through pipe 17, three-way valve 4, pipe 16, pump 11, and pipe 15.

When the collection bag 5 deflates enough to displace the magnet 7 a predetermined distance from the proximity switch 8, the proximity switch 8 opens and 12-volts is removed from relay 903 coil causing the relay input 903a to switch to the 903d pole. This action causes 24-volts to be applied to the collection input 911 of the valve motor 904 for the predetermined time period which is determined by the cam switch CS1. As power is applied to the valve motor 904, it causes the valve 4 to rotate to the collection port. The start of this rotation also switches cam switch CS2 to the open pole F thereby de-energizing the relay 905 and stopping the timer 11a and the metering pump 11. At this time, another collection cycle begins.

During the discharge and data logging cycles, the collection of water is interrupted for approximately fifteen seconds. Depending upon hydrologic conditions and data requirements, discharge volumes can be modified over a wide range by varying the size of the collection bag 5, or adjusting the proximity switch 8, or discharge rate of the pump 11.

Since the volume of water discharged in one cycle can be predetermined and will subsequently remain relatively constant, the recorded discharge times can be used to determine the groundwater discharge rate for the ground surface area covered by the meter during any measured time period. At the same time, the use of the pressure transducer 13 enables a correlation to be made between the groundwater discharge and the tidal/sea state conditions in the coastal areas.

Using other commercially available sensors, the present invention can also simultaneously record other hydrological conditions, including tidal pressure as discussed above, to afford scientists a correlation capability.

Figure 3:
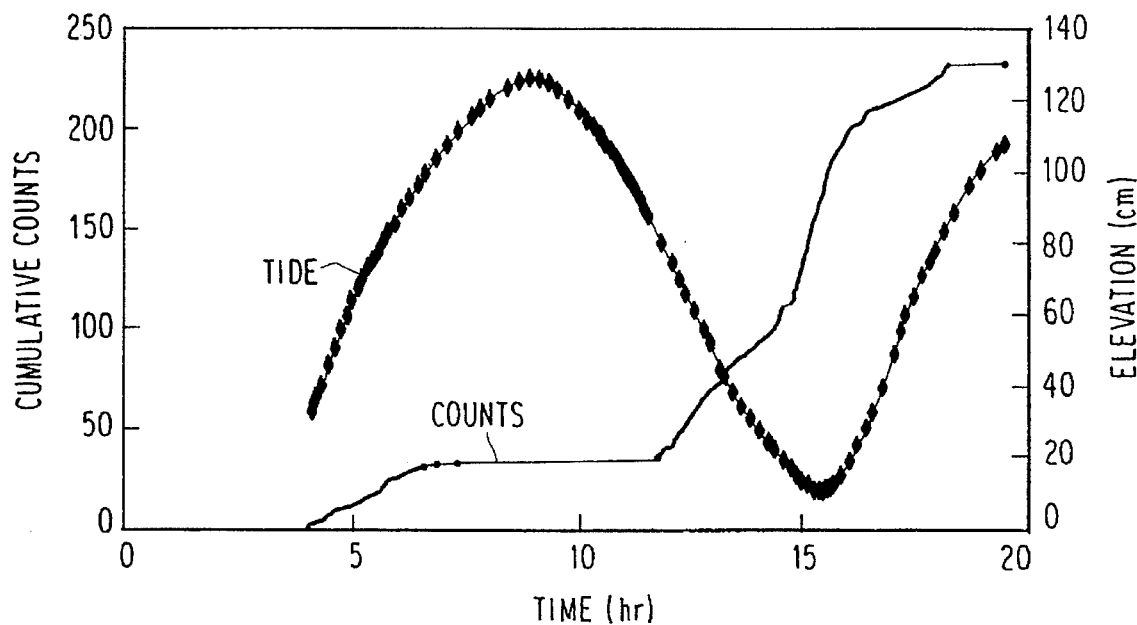
FIG. 3 is a graphic representation of the data recorded during a field test of a tidal creek site in the Chesapeake Bay.
Figure 4:
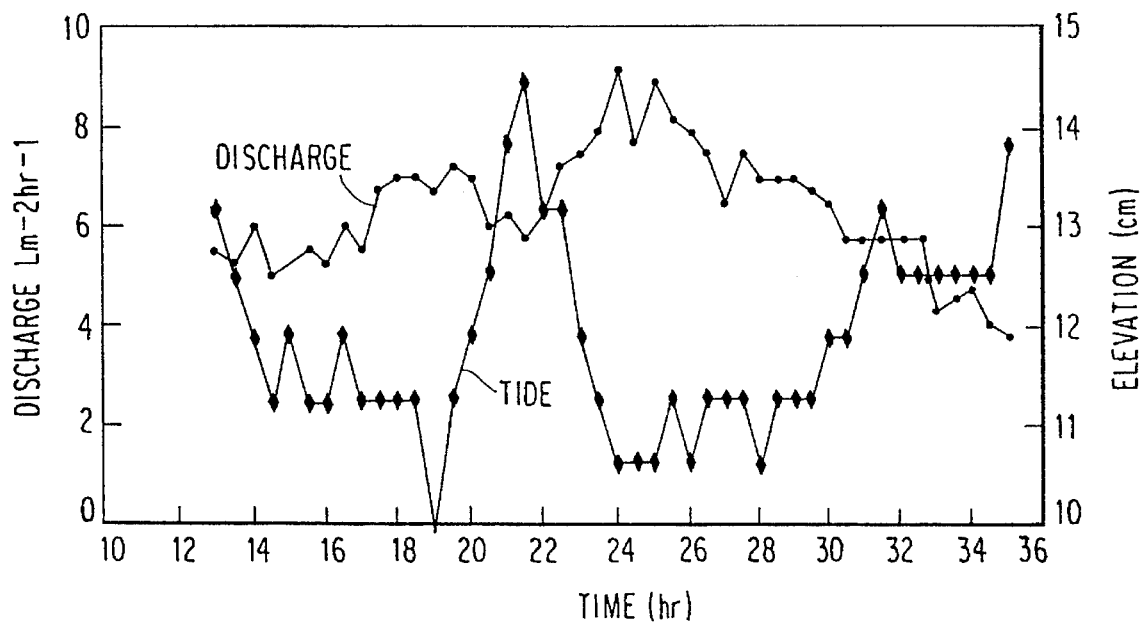
FIG. 4 is a graphic representation of the data recorded during a field test of a nearshore site in the Florida Bay.

For example, tests in the Florida and Chesapeake Bays were performed with the addition of a commercially available pressure transducer that measured and recorded tidal pressure, while the seepage meter was measuring groundwater seepage. These tests substantiated the theory that there is a correlation between high tide and the reduction of groundwater seepage. The results of these tests are illustrated in the charts of FIGS. 3 and 4.

Due to the flow resistance caused by the components inherent to the seepage meter design and alterations of the water's flow path induced by the meter itself, experiments were conducted to compare actual versus measured discharge rates. Efficiency experiments were conducted in a constant head flow tank (having 1.0 m$^2$ cross-sectional area) filled with a well-sorted fine sand. The constant head flow tank was allowed to equilibrate to a specific discharge for one hour and calibration experiments were conducted for a two hour period. The seepage meter was reinstalled for each individual test. Measured discharges (Q') were determined by equation (1):

$$Q'=(C_c*V)/(A*T) \quad (1)$$

wherein:

Q'=Measured discharge L•m$^{-2}$•hr$^{-1}$ $C_c$=Cumulative counts

V=Pump out sequence volume (L$^3$)

A=Area enclosed by seepage meter (m$^2$)

T=Time period (hr)

The ratio of Q' to Q, where Q is the actual discharge rate, was compared to determine seepage meter efficiency and accuracy. Experimental results, which compare the seepage meter efficiency under varying discharge rates are given below in TABLE 1.

TABLE 1

| Actual Discharge Rate L · m$^{-2}$ · hr$^{-1}$ | Measured Discharge Rate L · m$^{-2}$ · hr$^{-1}$ | Percent Mean Efficiency |
| --- | --- | --- |
| 6.00 | 1.26 | 21 |
| 10.32 | 2.52 | 26 |

The mean efficiency of standard manual meter design has been shown to be approximately 60 percent. Following initial installation, a specific time period is required to equilibrate hydraulic pressures between ambient surface water and water enclosed within the meter system, however, this is generally on the order of minutes.

Even though the seepage meter displays a slight negative buoyancy, settling of the meter into the sediment may occur, resulting in an increase of pressure inside the meter and displacement of water into the collection bag (i.e., 1 mm of settling would equal approximately 250 ml displacement of water). The effect of settling was determined by installing the meter into the sediment under no-flow conditions. Results using well-sorted sand indicated no significant settling effect. However, caution should be exercised in high porosity, low dry bulk density unconsolidated sediments (i.e., silt-clay mixes).

The apparatus as described above was field tested at two locations, which varied in sediment type and seepage discharge. The first site was located in a tidal creek on Virginia's Eastern Shore and characterized by a tidal range of approximately 1.0 meter. Nearshore surficial (upper 20 cm) quartz sandy sediments were conducive for water transport, exhibiting a mean porosity and vertical hydraulic conductivity of 0.45 and 10$^{-2.4}$ cm•sec$^{-1}$, respectively. The second site was located in the nearshore zone of Florida Bay which exhibits a tidal range on the order of 0.10 m. Vertical hydraulic conductivity and porosity of surficial carbonate sediments were on the order of 10$^{-2.0}$ cm•sec$^{-1}$ and 0.40, respectively. Field test results for the Virginia Eastern Shore and Florida Bay sites are presented in FIGS. 3 and 4, respectively.

As illustrated in FIGS. 3 and 4, the discharge (i.e., counts) rates show an inverse relation to the tidal elevation at the Chesapeake Bay site. During high tides, water levels within the tidal creek caused hydraulic gradients between 0.7 meters below the sediment-water interface and surface waters to approach and equal 0.00, thereby effectively shutting down submarine groundwater discharge. (Hydraulic gradient (dh/dl) is the change in hydraulic head per unit distance (I), where hydraulic head (h) describes the total energy in a moving mass of water at a particular point.)

Conversely, as the tide recedes, vertical hydraulic gradients (up to 0.19 m•m$^{-1}$ at ebb tide) and discharge rates increase in concert. The remotely controlled seepage meter allowed for the collection of 246 discharge data points as compared to the four to ten time integrated data points that would have normally been collected using manual methods.

As with the Chesapeake Bay site, the Florida Bay study site displayed a correlation with tidal stage (FIG. 4). It should be noted that the data set for the Florida Bay was summarized and consists of 1166 data points collected over a 22 hour time period.

There has thus been shown and described a novel remotely operating semi-continuous flow rate logging seepage meter for measuring the movement of groundwater seepage into surface water bodies on a semicontinuous basis and for logging the measured information, which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

We claim:

1. An apparatus for determining the flow ram of groundwater seepage, comprising:

a collection inlet and a discharge outlet;

a collection bag, coupled to said collection inlet and said discharge outlet, for collecting ground water through said collection inlet during a collection cycle and discharging groundwater through said discharge outlet during a discharge cycle;

a controller, responsive to first and second signals, for controlling the collection and discharge cycles;

a switching circuit producing said first signal after a predetermined amount of groundwater is collected in said collection bag during said collection cycle and producing said second signal after a predetermined amount of groundwater is discharged during said discharge cycle;

a data logger, responsive to a first output of said controller, for measuring at least one of the amount of groundwater collected and discharged so as to determine the flow rate of groundwater seepage; and a chamber for housing said collection bag, and wherein said switching circuit comprises a magnet fixed to said collection bag and a proximity switch disposed on an inner surface of said chamber such that when said magnet is within a first predetermined distance from said proximity switch said switching circuit produces said first signal and when said magnet is a second predetermined distance away from said proximity switch said switching circuit produces said second signal.

2. The apparatus as defined in claim 1, wherein said chamber has openings to the surrounding atmosphere such that the chamber and said collection bag are maintained at sea pressure.

* * * * *